United States Patent
Weibel

(10) Patent No.: US 9,821,947 B2
(45) Date of Patent: Nov. 21, 2017

(54) RECEPTACLE AND METHOD FOR STORING AND SUPPLYING A LIQUID AND A LIQUID MEDICAL PREPARATION

(71) Applicant: Vifor (International) AG, St. Gallen (CH)

(72) Inventor: Ludwig Daniel Weibel, Waldstatt (CH)

(73) Assignee: Vifor (International) AG, St. Gallen (CH)

(*) Notice: Subject to any disclaimer, the term of this patent is extended or adjusted under 35 U.S.C. 154(b) by 208 days.

(21) Appl. No.: 13/958,970

(22) Filed: Aug. 5, 2013

(65) Prior Publication Data

US 2013/0319573 A1 Dec. 5, 2013

Related U.S. Application Data

(63) Continuation of application No. 13/120,448, filed on Aug. 8, 2011, now abandoned.

(30) Foreign Application Priority Data

Sep. 29, 2008 (EP) .................. PCT/EP2008/063047

(51) Int. Cl.
*B65D 85/00* (2006.01)
*A01N 43/04* (2006.01)
(Continued)

(52) U.S. Cl.
CPC .............. *B65D 85/00* (2013.01); *A61J 1/10* (2013.01); *B32B 1/02* (2013.01); *B32B 27/08* (2013.01);
(Continued)

(58) Field of Classification Search
None
See application file for complete search history.

(56) References Cited

U.S. PATENT DOCUMENTS 1,438,487 A * 12/1922 Greene .......................... 222/215
3,991,758 A * 11/1976 Mohrke et al. ............... 604/403
(Continued)

FOREIGN PATENT DOCUMENTS

DE 102007009457 8/2008
EP 1941869 7/2008

OTHER PUBLICATIONS

Cancado, Robert, et al. Efficacy and safety of intravenous iron sucrose in treating adults with iron deficiency anemia, Revista brasileira de hematologia e hemoterapia 2011 pp. 439-443, available at <https://www.ncbi.nlm.nih.gov/pmc/articles/PMC3459362>.*
(Continued)

*Primary Examiner* — Tatyana Zalukaeva
*Assistant Examiner* — Sara Sass
(74) *Attorney, Agent, or Firm* — Rankin, Hill & Clark LLP

(57) ABSTRACT

A method and a receptacle for storing and supplying a liquid, especially a liquid medical preparation. It is an object of the invention to provide a suitable receptacle and method for storing and supplying a desired liquid quantity. It is solved by a liquid tight and preferably gas-tight receptacle, comprising a compressible tube (7) or foil bag. A rigid opening portion (6) is sealingly mounted to one end of the tube (7). The diameter of the opening portion (6) is the same as the diameter of the tube (7). The tube (7) diameter is not more than 10 mm The liquid has a volume of not more than 1.5 ml, preferably of not more than 1.3 ml. The tube (7) contains additionally a gas having a volume of 10 to 15% of the liquid volume. The tube (7) or foil bag comprises a flat portion having an inscription.

16 Claims, 6 Drawing Sheets

(51) Int. Cl.
*A61J 1/10* (2006.01)
*B32B 1/02* (2006.01)
*B32B 27/08* (2006.01)
*B32B 27/32* (2006.01)
*B32B 27/30* (2006.01)

(52) U.S. Cl.
CPC ............ *B32B 27/306* (2013.01); *B32B 27/32* (2013.01); *B32B 2250/24* (2013.01); *B32B 2255/10* (2013.01); *B32B 2255/20* (2013.01); *B32B 2307/546* (2013.01); *B32B 2307/7242* (2013.01); *B32B 2307/7244* (2013.01); *B32B 2307/7265* (2013.01); *B32B 2439/80* (2013.01)

(56) References Cited

U.S. PATENT DOCUMENTS

| | | | | |
|---|---|---|---|---|
| 4,955,391 | A * | 9/1990 | Parker et al. | 600/584 |
| 5,238,148 | A | 8/1993 | Holoubek et al. | |
| 5,328,681 | A * | 7/1994 | Kito | A61K 9/5094 252/62.56 |
| 5,895,383 | A | 4/1999 | Niedospial, Jr. | |
| 5,896,989 | A | 4/1999 | Ropiak et al. | |
| 7,594,578 | B2 * | 9/2009 | Smith et al. | 206/438 |
| 2005/0037996 | A1 * | 2/2005 | Beck | A61K 31/191 514/59 |
| 2006/0091033 | A1 * | 5/2006 | Hall | A61C 8/0087 206/438 |
| 2006/0229483 | A1 | 10/2006 | Kuechler et al. | |
| 2008/0274230 | A1 * | 11/2008 | Johns | A61K 39/0008 426/2 |
| 2009/0023686 | A1 * | 1/2009 | McCall, Jr. | A61K 31/194 514/106 |
| 2010/0163577 | A1 | 7/2010 | Hansen | |

OTHER PUBLICATIONS

International Search Report dated Jun. 29, 2009, PCT/EP2008/063047, 2 pages.
International Preliminary Report on Patentability for corresponding PCT/EP2008/063047 dated Jan. 13, 2011, five pages.
Madsen, H., et al. "Guide to Parenteral Nutrition Management for Adult Patients". Practical Gastroenterology, Jul. 2006.
"Total Parenteral Nutrition". The Merck Manual, Apr. 2009. <http://www.merckmanuals.com/professional/nutritional_disorders/nutritional_support/total_parenteral_nutrition_tpn.html>.

* cited by examiner

RECEPTACLE AND METHOD FOR STORING AND SUPPLYING A LIQUID AND A LIQUID MEDICAL PREPARATION

The invention relates to a method for storing and supplying a liquid, especially a liquid medical preparation. The invention further relates to a receptacle for storing and supplying a liquid, especially a liquid medical preparation and a liquid medical preparation.

After the production of a liquid medical preparation, the liquid medical preparation is generally filled into a container. Such a container is called primary packaging. A glass ampoule is well-known as primary packaging which is to be opened with a special saw, or which is provided with a frangible portion for opening the ampoule. The primary packaging keeps the liquid medical preparation sterile for a long time. In order to withdraw a desired quantity of the liquid preparation from the primary packaging, a syringe is suitable, for example as it is known from DE 10 2005 052 472 A1. With a syringe, the desired quantity of the liquid medical preparation can be proportioned exactly. Further, it is possible to inject an exact quantity of a liquid medical preparation.

There are further devices for administering liquid medical preparations to a patient, for example a hemodialysis machine. As a rule, it is possible to inject a liquid medical preparation into such a device by means of a syringe. For this reason, ports of such machines are adapted to the opening of a syringe.

A container for a medical liquid, which container is gas- and liquid-tight, is known from US 2002/0007155 A1. The container serves as a primary packaging means for accommodating a medical liquid. The container comprises a foil bag which is closed at both ends and which is deformable. The container has a flange which is stable in respect of shape and which is sealingly disposed on the foil bag and which is in the form of a releasable connecting element for fitting the container onto a discharge connection member. The foil bag comprises a welded seam with which the foil bag is closed at one end and which extends substantially transversely with respect to the axis of the bag. A sealing location in the flange is stable in respect of shape. A discharge location for the liquid in the region of the flange is also stable in respect of shape. The container has a filling volume of 1 ml to 4 ml. The casing diameter is from 10 mm to 30 mm. The solutions are discharged in a portion-wise manner with a respective dosage of 10 µl to 50 µl.

It is necessary to label a packaging containing a liquid medical preparation in accordance with national statutory requirements. It is difficult to mark a tube which already contains a liquid preparation. In such a case, it is necessary to use a shrinking foil for marking a tube. For this reason, it is advisable to mark the empty tube or the empty foil bag for economical reasons. Afterwards, the tube or foil bag comprising the inscription is filled with the liquid medical preparation. However, if a tube or a foil bag has a volume of only a few ml, it is not possible, as a rule, to produce a large volume of the liquid medical preparation, since each customer may need a different inscription. To produce only a small volume of a liquid medical preparation increases the production costs. For this reason, it is expensive to use a foil bag as a primary packaging for liquid medical preparations.

According to the state of the art, a primary packaging and a further instrument such as a syringe is necessary in order to administer a liquid medical preparation to a patient. In order to avoid a primary packaging, it is known to load a syringe directly with a liquid medical preparation. The syringe serves as a storage as well as a supply container. Since a syringe comprises a movable part, namely a piston, it is difficult to keep a medical preparation sterile for a long time. Furthermore, several different materials are in contact with the medical preparation and the parts have to been siliconized. Otherwise, the piston may easily stick.

Accordingly, it is an object of the invention to provide a more suitable receptacle and method for storing and supplying a desired liquid quantity.

The object of the invention is solved by a receptacle for storing and supplying a liquid which receptacle is liquid tight and preferably gas-tight comprising a tube or a foil bag which can be compressed. The tube or foil bag preferably comprises a rigid opening portion sealingly mounted to one end of the tube. The diameter of the opening portion preferably is the same as the diameter of the tube. The rigid opening portion is stable in respect of shape. The tube diameter preferably is not more than 10 mm and, in an embodiment of the invention, the tube contains a liquid, preferably a liquid medical preparation. The liquid has a volume of not more than 1.5 ml, preferably of not more than 1.3 ml. Preferably, the tube contains additionally a gas having a volume of preferably 10 to 30%, preferably to 15% of the liquid volume. The gas may be oxygen. In an preferred embodiment of the invention, the gas is nitrogen, in particular if the liquid contains iron. As a rule, the filling volume of the receptacle is 0.5 to 2 ml. The tube or foil bag preferably comprises a flat portion having an inscription.

To store a liquid in a receptacle means to store the liquid in the receptacle at least for one week, preferably at least for one month, more preferably for up to three years.

If there is a flat portion, it is possible to mark a liquid tight tube or liquid tight foil bag already containing a liquid. As a result, it is possible to produce a large liquid volume and to fill the produced liquid into a lot of small tubes or foil bags, for example into 200,000 tubes and foil bag. If a customer wants to buy a few tubes or foil bags, it is no problem to mark the tube already containing the liquid according to the requirements of the customer. It is not necessary to use a shrinking foil. It is possible to print an information on the flat portion and/or to put a conventional self-adhesive foil respectively label on one side of the flat portion or on both sides.

In an embodiment of the invention, a foil preferably a self-adhesive bar code label is slicked on a surface of the flat portion. If a liquid medical preparation was supplied to a patient, it is possible to remove the foil respectively the self-adhesive bar code label from the flat portion and to stick the foil, preferably the self-adhesive bar code label in the dossier of the patient. This embodiment of the invention helps to make no mistake during the therapy of a patient.

If an information has been printed on the flat portion and there is additionally a foil or label comprising the same information, it is possible to remove the foil respectively the self-adhesive bar code label from the flat portion and to stick the foil, preferably the self-adhesive bar code label in the dossier of the patient without eliminating the information from the receptacle.

It is possible to close one end of the tube as well as the opening portion attached at the other end of the tube, for example by welding. As a result, it is possible to keep a liquid medical preparation sterile for a long time. In order to supply the liquid to a patient or a device, if is necessary to open the opening. For this reason, the opening comprises in an embodiment of the invention a frangible portion. The opening can be opened easily by breaking the frangible portion. Alternatively, it is possible to cut open the opening by a scissors.

It is further possible to provide a flat portion by welding. Preferably, one end portion of a tube is compressed in order to provide the flat portion. If the flat end of the tube is at least 1 cm, preferably at least 3 cm long, it is possible to put a label containing a lot of information on the flat portion, and it is easy to grip and to handle the receptacle. It is possible to put a label on a flat portion in an easy and quick manner since it is not necessary to rotate the receptacle. For the same reason, it is possible to read out an information in an easy and very fast manner for example by a reading device like a scanner. By comparison with a tube, a flat portion provides advantages of speed. Additionally, it is possible to amend or to change an inscription during printing.

If a person compresses the tube using a thumb and a finger, for example the forefinger, and the opening of the tube is directed downwards, a liquid volume of 1 ml will always leave the container, if the container is a deformable tube having a diameter of not more than 13.5 mm, preferably not more than 10 mm, comprising a rigid opening portion and containing a liquid volume of 1.3 ml. Tests showed that the quantity of the liquid which leaves the tube by the compressing action does not depend on the size of a thumb and the finger of an adult. Tests further showed that the quantity of the liquid depends on the size of a thumb and a finger, if the diameter of the tube is substantially greater than 13.5 mm and/or if the volume of the liquid is substantially more than 1.5 ml and/or the opening attached to one end of the tube is not rigid. As a result, the receptacle comprising the above-mentioned features is well-suited for providing a liquid of a desired quantity of about 1 ml and less by a simple compressing action in a reproducible manner. This is especially true, if the quantity of the liquid does not exceed 1.3 ml and/or the tube additionally contains a gas in an amount of preferably 10% to 15% of the liquid volume.

The receptacle comprising the features of claim 1 is able to store a liquid and keep it sterile for a long time. In this respect, the receptacle acts as a primary packaging. Further, it is possible to provide an exact quantity of a liquid. In this respect, the receptacle of claim 1 acts like a syringe.

In a preferred embodiment of the invention, the opening of the tube looks like the opening of a syringe or a pen. It is therefore possible to handle the receptacle like a syringe in order to inject the liquid into a conventional medical device, preferably into a hemodialysis machine comprising ports adapted to the opening of a conventional syringe.

In a preferred embodiment of the invention, the liquid is a liquid medical preparation which preferably contains iron, more preferably iron as a Complex. As a rule, liquid iron preparations are not stable in the presence of $O_2$ or $CO_2$. In many cases, it is possible to keep a liquid iron preparation stable by storing the preparation in the gas-tight receptacle.

The wall of the tube may be a foil of plastic material or metal or metal alloy like aluminum, gold or copper. In a preferred embodiment of the invention, the wall of the tube is composed of a composite foil comprising preferably three single foils. The outer and the inner foil of the wall preferably are composed of the same material. The outer and the inner foil are, in particular, made of polypropylene. If the inner and the outer foil are composed of the same material, it is easily possible to form a tube out of the laminated foils and to bond an overlapping portion together by welding. This is especially true if the outer and the inner foil are composed of a thermoplastic material such as polypropylene.

On the one hand, a thin foil made of polypropylene is sufficiently flexible in order to form a flexible tube having a diameter of 13.5 mm, 10 mm and less. On the other hand, it is possible to provide a rigid opening composed of polypropylene comprising a frangible portion. For these reasons, polypropylene is a preferred material.

An intermediate foil of the tube wall acts as a $CO_2$ and an $O_2$ barrier. For this reason, an intermediate foil may be composed of Ethylene-Vinyl-Alcohol-Copolymer (EVOH). Alternatively, the intermediated layer is a support layer coated with $SiO_x$. The support layer is a foil made of a material so that the support layer can be laminated with the adjacent foils. If there is an intermediate foil acting as a $CO_2$ and $O_2$ barrier, a liquid medical preparation containing iron can be stored for a long time in the receptacle.

As a rule, it is not possible to store a liquid medical preparation containing iron for a long time in a container made of plastic. In order to overcome this problem, the liquid medical preparation contains iron as well as NaCl, preferably at a concentration of between 1 and 3 percent by weight. The NaCl concentration should be at least 2 percent by weight in order to ensure that it is possible to store the liquid medical preparation for a long time in a receptacle made of plastic material.

As a rule, a liquid medical preparation contains 1 to 5 percent by weight of iron. In an preferred embodiment of the invention, the liquid medical preparation contains iron at a concentration of between 5 and 10 percent by weight in order to provide a preparation which is more stable. If the iron concentration is between 5 and 10 percent by weight, the liquid medical preparation is used as an injection preparation.

In an embodiment of the invention, the receptacle comprises one or more of the above mentioned features but may have a volume of more than 1.5 ml. In this embodiment, the opening of the receptacle is connected to a non return valve. In this case, a solution in the receptacle is discharged in a portion-wise manner by compressing the tube several times especially for administering intravenously a medical preparation.

In an embodiment of the invention, the receptacle is produced by a coextrusion or injection molding process. However, in this embodiment it is not possible to provide a separate barrier foil.

The receptacle may be closed by a cap assembly known from US 2006/0178627 A1. Preferably, a cap assembly comprises the tip of the receptacle, wherein the tip is frangible and comprises a predetermined breaking point. An upper portion of the tip closes the receptacle. A lower tip portion comprises a passage as known from the state of the art. Hence, the receptacle is reliably sealed to prevent contamination or loss of the medication. Compared with the state of the art, a receptacle has a more effectively sealed tip. It is necessary to break the upper tip portion away in order to open the receptacle. A cap element protects the tip on one side. On the other side, unscrewing the cap breaks the upper portion away without hurting a person. In a preferred embodiment of the invention, the predetermined breaking point is concave and borders on the upper angular edge of the passage of the lower tip portion. As a result, breaking the upper tip portion away cannot damage the angular edge of the passage.

In an embodiment of the invention, the tip of a cap assembly comprises a plurality of projecting locking elements for attaching a fastening ring like a luer collar. Due to the luer collar, it is possible to screw a further cap element on the receptacle which may protect at least an upper portion of the tip. The cap assembly according to this embodiment may comprise an upper tip portion or a separate cap element closing the opening of the receptacle.

The projecting locking elements may provide a plurality of clearances in order to hold the fastening ring in appropriate manner. Preferably, the clearances are so designed that it is not possible to unfasten a fastening ring attached at the receptacle or at the tip portion without sustaining damage. This embodiment of the invention is suited for evidencing tampering or misuse of a pre-filled receptacle. On the other hand, the projecting locking elements are so designed that it is possible to fasten the fastening ring to the receptacle by a snapping action as already known from the state of the art.

In an embodiment of the preferred cap assembly, the cap element is attached at the fastening ring by an internal and an external thread or a bayonet joint. The cap element 13 comprises a plurality of locking tabs. In the closed position of the cap assembly, the locking tabs are enclosed with a form fit by locking recesses provided by projecting locking elements. The locking tabs and the corresponding locking recesses or the projecting locking elements are so designed that it is not possible to screw the cap element (13) on the tip. In contrast to the state of the art, the cap assembly evidences tampering or misuse of the syringe in all cases.

Figure 1:
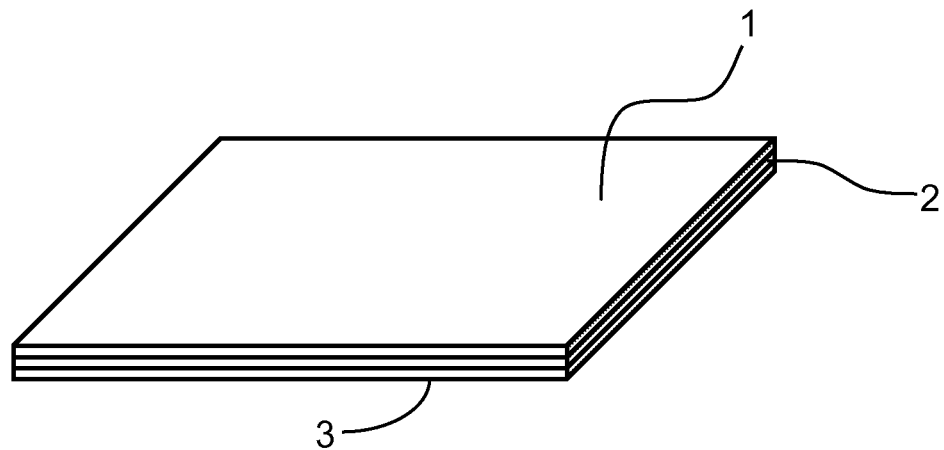
FIG. 1 is a perspective view of laminated foils.

FIG. 1 shows three foils which are bonded together. The foil 1 on the top as well as the foil 3 on the bottom are made of polypropylene. The intermediate foil 2 comprises a material acting as a $CO_2$ and an $O_2$ barrier. Due to the intermediate foil 2, the passage of $CO_2$ and $O_2$ through the laminated foils 1, 2 and 3 is restricted.

A foil thickness typically amounts to between 0.05 and 0.5 mm, preferably between 0.05 and 0.1 mm. Therefore, the thickness of the laminated foils is typically 0.15 to 1 mm, preferably 0.15 to 0.22 mm.

Figure 2:
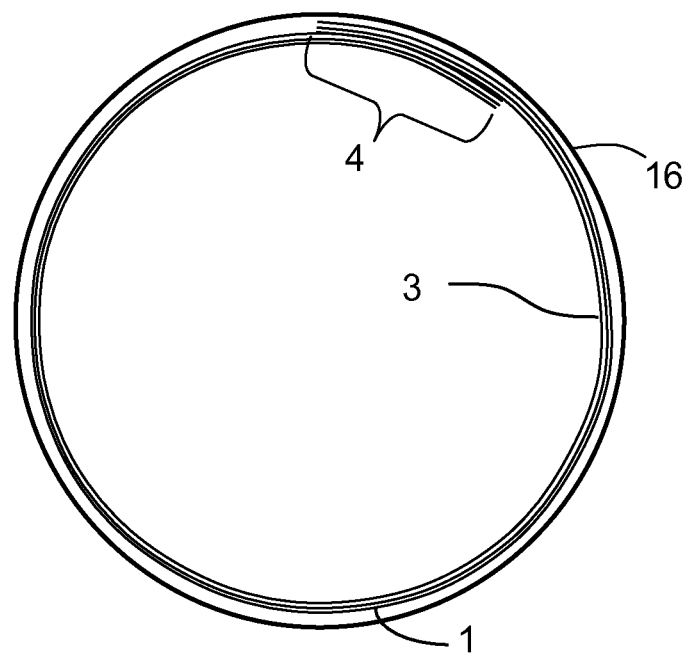
FIG. 2 is a cross section of a tube made of the laminated foils.

As shown in FIG. 2, a tube is formed of the laminated foils 1, 2, 3 having a diameter of 10 mm. The cross section of the tube is a circle. Forming a tube results in an overlapping portion 4 where the outer foil 1 adjoins the inner foil 3. The inner foil 3 and the outer foil 1 are welded together by transferring heat to the overlapping portion. An additional layer 16 is over extruded to cover the seal.

A rigid opening portion 6 is to be attached at the other end of the tube 7, in particular by welding. The base area of the rigid opening is circular in accordance with the cross section of the tube. The rigid opening portion 6 preferably consists of the same material as the inner foil 3 and the outer foil 1. If the rigid opening portion 6 consist of the same material as the inner foil 3 and the outer foil 1, it is easy to weld the opening portion 6 to the corresponding end of the tube 7.

In particular, the opening portion 6 consists of polypropylene. In an embodiment of the invention, the opening portion 6 comprises a $SiO_x$ coating, preferably inside the receptacle. A plasma spraying technique is suitable for coating the opening portion which is already attached to the tube with $SiO_x$. A material like polypropylene does not act as a barrier with regard to $O_2$ or $CO_2$. However, the $SiO_x$ coating serves as a $CO_2$ and $O_2$ barrier within the meaning of the present invention.

Figure 3:
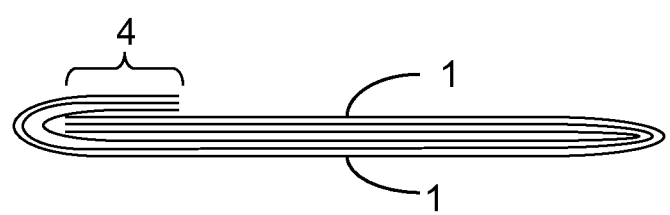
FIG. 3 is a cross section of one closed end of the tube.
Figure 4:
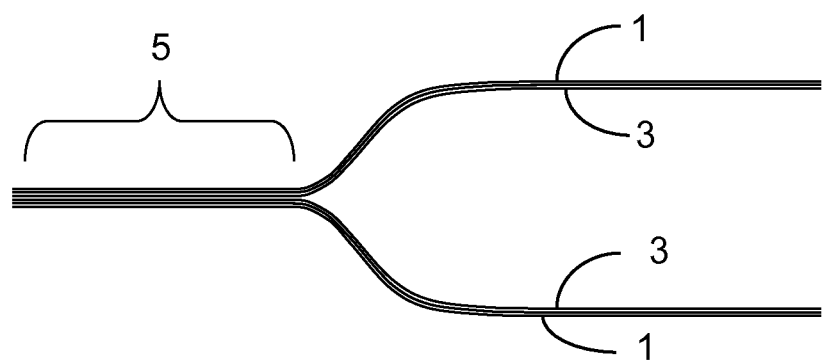
FIG. 4 is a cross section of a side view of the tube comprising one flat end.
Figure 5:
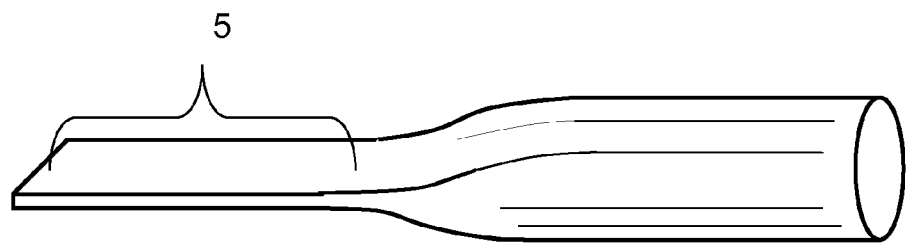
FIG. 5 is a perspective view of the tube comprising a flat end portion.
Figure 6:
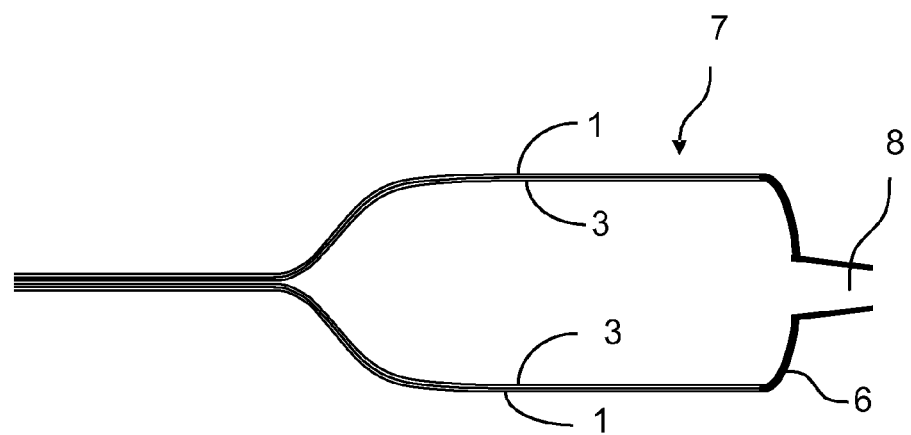
FIG. 6 is a cross section of a side view of the tube comprising one flat end and a rigid opening portion.

In order to close one end of the tube, this end will be compressed as shown in FIGS. 3, 4 and 5. The adjacent portions of the inner foil 3 will be welded together by ultrasonic or high frequency welding. As a result, there is a tube comprising one flat end portion 5, as shown in FIGS. 4 and 5. Preferably, the length of the flat portion 5 is at least 20 mm.

The opening 8 of the opening portion 6 can be closed by a closure cap. It is possible to provide a seal by a closure cap as it is known from EP 1 600 190 B1.

Figure 7:
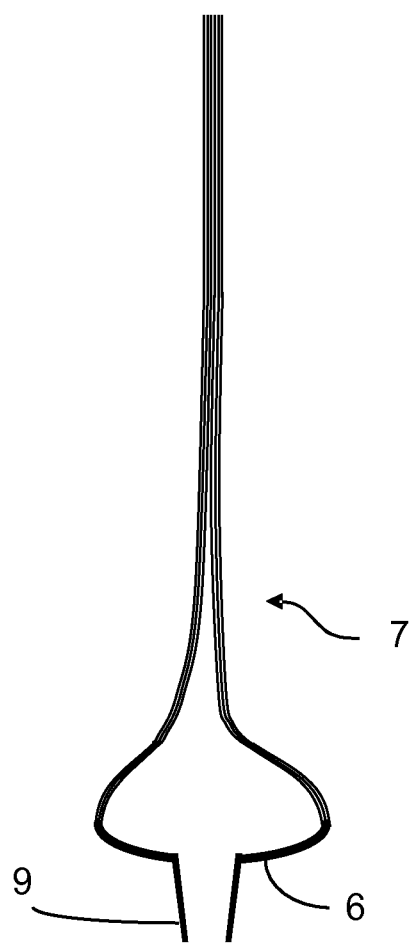
FIG. 7 is a cross section of a side view of the receptacle.

If the tube 7 is directed downwards and compressed as shown in FIG. 7 (especially by thumb and finger of an adult), the opening portion keeps its shape. As a result, there remains always the same volume adjacent to the opening portion 8. Tests showed that, therefore, always the same liquid amount comes out of the receptacle, if a person squeezes the tube by hand and the liquid quantity does not exceed 1.5 ml, preferably 1.3 ml. If the liquid volume in the receptacle amounts to 1.3 ml, a quantity of 1 ml comes out, if a person squeezes the receptacle.

Figure 8:
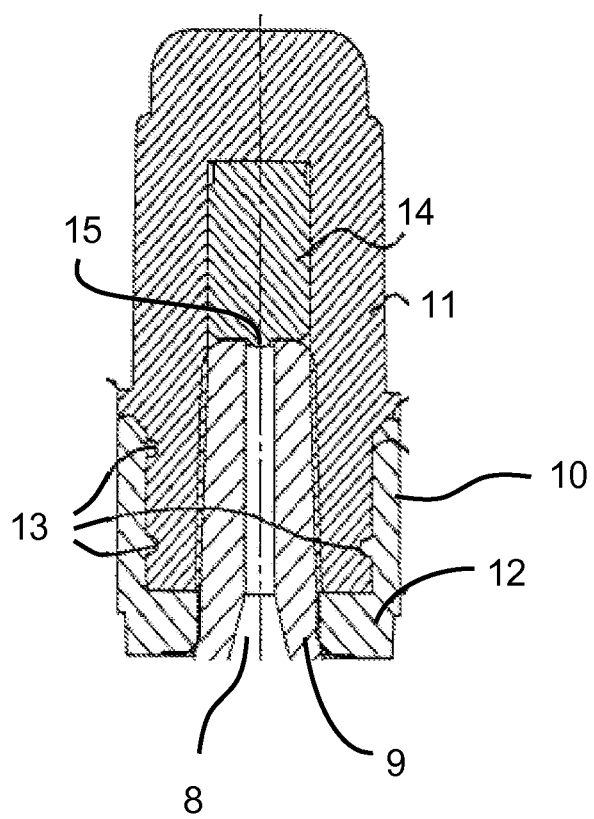
FIG. 8 is a cross section of a closure cap for sealing a tip of the receptacle.

FIG. 8 shows a preferred embodiment of a closure cap 11 for sealing the tip 9 wherein the opening 8 is formed. A fastening ring 10 is attached at the tip 9. The closure cap 11 is connected to the fastening ring 10 in such a way that it cannot be released from the latter without being destroyed. Further details are known from US 2006/0178627 A1, the entire disclosure of which is herein incorporated by reference.

The fastening ring 10 comprises an annular portion 12 which, when placed on the tip 9, is held securely on the tip for example by frictional forces.

For this purpose, an outer annular portion can have radially inwardly projecting contact portions which permit optimal fixing of the fastening ring on the tip. Moreover, the receptacle body can have, in the area of the tip, an outer annular bead (not shown) which the fastening ring can engage around with a form fit, thus leading to further improved fixing. This is known per se, and so the securing of the fastening ring on the syringe body will not be described in detail here.

The annular portion 12 of the fastening ring is adjoined distally by a hollow cylindrical fastening wall 10 whose inner face has thread elements 13. The closure cap 11 has the shape of a hollow cylinder closed at one end, and, in the assembled state, the tip 9 of the receptacle body is arranged inside the hollow cylinder.

The closure cap 11 has a proximal portion adjacent at the annular portion 12 and a distal portion. A closure plug 14, which is let into the closure cap 11, has, at a proximal end face, a central protruding portion 15 which, when fitted, engages in the distal opening of the tip 9 in order to reliably seal the receptacle. The closure plug can be formed in one piece with the closure cap 11.

Preferably, the closure plug 14 consists of a material which serves as a seal. For this reason, the closure plug, in an embodiment of the invention, consists of a bromobutyl rubber. In an embodiment of the invention, the closure cap 11 consists of a rubber, especially of an elastomer, in order to facilitate the production of complex shapes of the closure cap 11.

As complements to the thread elements 13 of the fastening ring, the proximal portion of the closure cap 11 has thread elements for holding the closure cap 11 in the fastening ring. As an alternative to thread elements, the proximal portion of the closure cap 11 can have outwardly protruding engagement portions which engage in thread elements of the fastening ring in order to hold the closure cap 11 in the fastening ring, or, conversely, the fastening ring could have engagement portions which protrude inwardly from its fastening wall and interact with thread elements of the closure cap.

Formed on the outside of the distal portion of the closure cap 11, there are, in an embodiment of the invention, longitudinal ribs which improve handling when unscrewing the closure cap 11 from the fastening ring.

In an embodiment of the invention, heat is used to sterilize the receptacle containing the liquid medical preparation. An autoclave is used to sterilize the receptacle in order to be able to heat up to 121° C. and to ensure sterility of the receptacle. Preferably, the autoclave contains nitrogen since the liquid iron preparation is often not stable in the presence of $O_2$.

Figure 9:
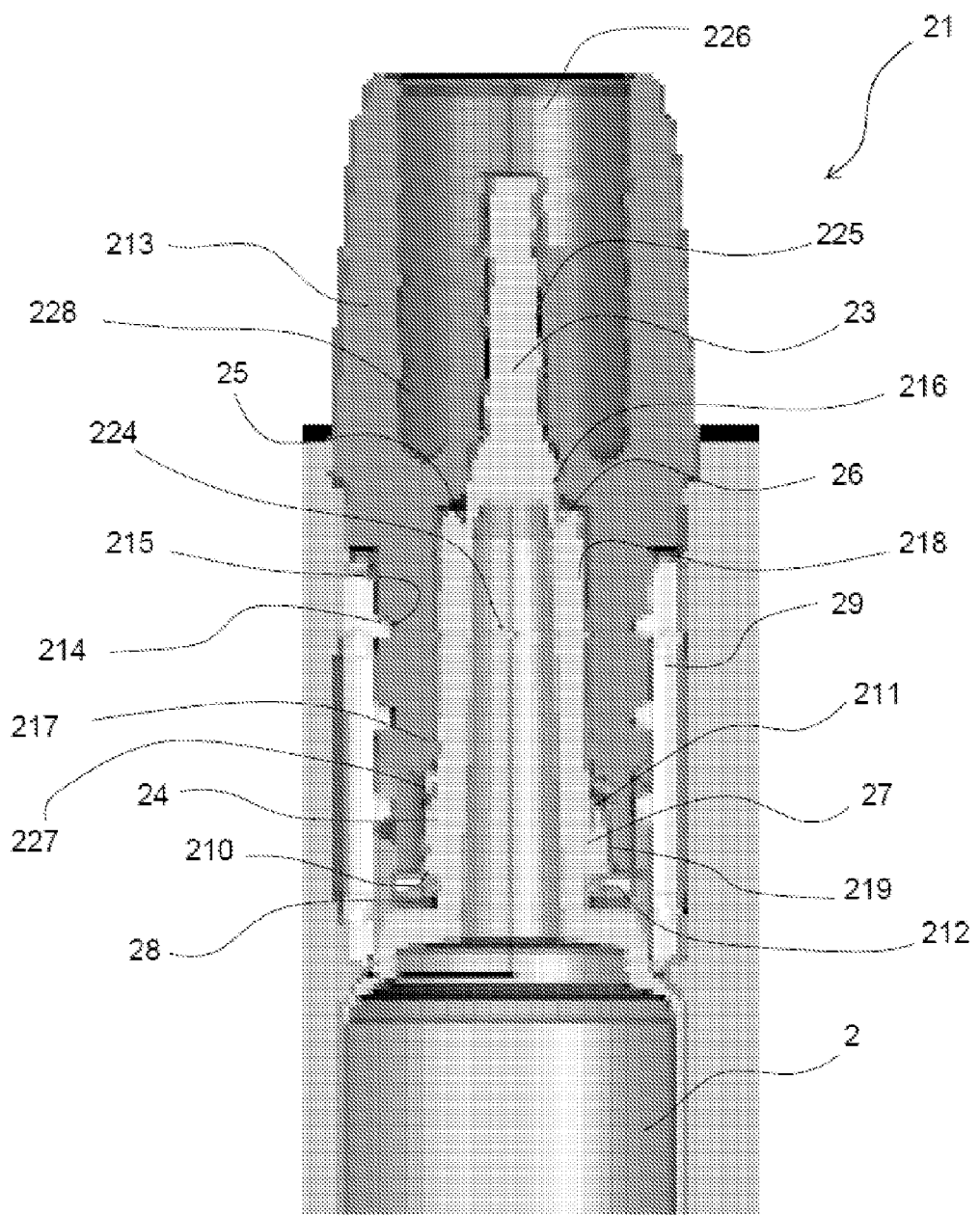
FIG. 9 is a cross section of a preferred cap assembly for sealing a tip of the receptacle.

FIG. 9 shows an embodiment of the invention, a cap assembly 21 comprising a frangible tip of a receptacle 22. The receptacle may be a syringe or a tube. The tip is composed of an upper tip portion 23, a lower tip portion 24 and a predetermined breaking point 25 between the upper and the lower tip portion. The tip is frangible due to the predetermined breaking point 25. The lower tip portion looks like a hollow needle comprising a canal 224. The tip is made in one piece and closes the receptacle respectively the distal end of the canal 224. Breaking the upper tip portion 23 opens the receptacle 22 respectively the distal end of the canal 224. Hence, the upper tip portion acts as a closure of the receptacle. Since the tip is made in one piece, it is impossible that the closure of the receptacle comprises a leak or something like that. The predetermined breaking point 25 is concave and borders on the upper angular edge 26 of the lower tip portion 24. Breaking the upper tip portion will not damage the upper angular edge 26. Hence, after opening the receptacle there is an undamaged distal tip opening as known from a syringe and the like.

The lower tip portion comprises a plurality of projecting locking elements 27 adjacent at the body 22 of the receptacle. The projecting locking elements 27 and the lower tip portion 24 are made in one piece. The projecting locking elements 27 provide a plurality of clearances 28 for attaching a fastening ring 29 to the receptacle respectively to the lower tip portion 24. These clearances are between the projecting locking elements 27 and the main body of the receptacle. The projecting locking elements 27 are so designed that it is possible to fasten the fastening ring 29 to the receptacle by a snapping action. However, it is not possible to unfasten the fastening ring without sustaining damage. For this reason, the angles between the lower side walls 210 of the projecting locking elements 27 and the adjacent side wall of the lower tip portion 24 are 90° or smaller. The opposite side walls 211 of the projecting locking elements 27 are inclined and act as ramp with regard to an annular protrusion 212 of the fastening ring 29.

The annular protrusion 212 attaching the fastening ring to the receptacle is inside of the fastening ring 29. The annular protrusion 212 and the fastening ring are made in one piece.

The cap assembly 21 comprises a cap element 213. The fastening ring 29 and the cap element 213 comprise interacting thread elements 214 and 215 which define a thread pitch. Due to the thread elements 214 and 215, it is possible to open the receptacle by unscrewing the cap element 213. A ring-like portion 216 of the cap element 213 is pressed against the upper tip portion 23, acts as a seal and grips the upper tip portion 23. For this reason, unscrewing of the cap element 13 breaks the predetermined breaking point 25 and opens the receptacle. There is a further ring-like portion 217 which is pressed against the lower tip portion 24 acting as a seal. There remains a well-defined cavity 218 between the two seals 216 and 217. Hence, contamination of the lower tip portion including the edge 26 within the well-defined cavity is not possible.

Due to the conical profile of the lower tip portion 24 unscrewing of the cap element 213 removes the lower ring-like portion 217 from the lower tip portion at once. For this reason, the lower ring-like portion 217 cannot prevent unscrewing of the cap element 13.

The cap element 13 comprises a plurality of locking tabs 219. In the closed position of cap assembly 1, the locking tabs 219 are enclosed with a form fit by locking recesses 220. The locking recesses are provided by the projecting locking elements 27. In contrast to the teaching known from US 2006/0178627 A1, the locking tabs 219 and the corresponding locking recesses will not irreversibly deformed or damaged by unscrewing the cap element 213. As shown in FIG. 3, the locking tabs 219 and the corresponding locking recesses 220 respectively the projecting locking elements 27 are so designed that it is not possible to screw the cap element 213 on the tip 23 and 24. Due to the inclinations 221, it is possible to unscrew the cap element 213. However, due to the stopping portions 222 and the tips 223 of the projecting locking elements 27, it is impossible to screw the cap element 213 on the tip of the receptacle 22.

A cylinder-like gap 225 remains between the cap element 213 and the upper tip portion 23. The cylinder-like gap 225 extends to the seal 216 on one side and to an opening 226 on the other side. It is possible to evacuate the opening in order to check the operability of the seal 216. In a similar way, it is possible to evacuate an opening 227 leading to the seal 217 in order to check the operability of the seal 217.

The cap element 213 comprises a cylinder-like recess 228 surrounding the upper tip portion 23. Due to the cylinder-like recess 228, it is possible to grip the cap assembly 21 from the bottom for example by a pinion. It is then possible to fill the receptacle with a medical preparation from the top without running into problems. In order to avoid a contamination, there is as a rule a laminar gas flow top down during filling the receptacle. For this reason, means for handling the receptacle in the upper region during filling the receptacle are able to disturb the process. Due to the cylinder-like recess 228, handling means in the upper region are not necessary. After filling the receptacle 22, the corresponding end will be closed for example by welding or a corresponding method.

Preferably, the receptacle 22 as well as the cap assembly 1 are made of plastic.

Providing the cap assembly 21 is very easy. At the beginning, the cap element 213 will be screwed on the fastening ring 29. Afterwards, the fastening ring 29 will be pushed against the corresponding end of the body of the receptacle 22 thereby providing a snap-in connection between the projecting locking elements 27 and the annular protrusion 212. Afterwards, it is not possible remove the fastening ring 29 from the receptacle. For this reason, it is not possible to close the receptacle by the cap assembly 21 once again.

The invention claimed is:

1. A liquid tight receptacle for storing and supplying a liquid comprising a tube formed from a liquid-tight and gas-tight compressible foil, wherein at least a first end portion of the foil is compressed and welded, thereby providing a flat portion at one end of the tube, wherein the length of the flat portion is at least 30 mm, and wherein a rigid opening portion is sealingly mounted to the other end of the tube, wherein the rigid opening of the tube takes the shape of an opening of a syringe, wherein the tube contains a liquid medical preparation for injection into an extracorporeal circuit, the liquid medical preparation contains 1 to 10 weight percent iron, wherein NaCl is present at a concentration of between 1 and 3 percent by weight.

2. The receptacle according to claim 1, wherein the liquid medical preparation further contains NaCl.

3. The receptacle according to claim 1, wherein the receptacle further comprises at least one of (a) a self-adhesive bar code label and (b) information printed on the flat portion.

4. The receptacle according to claim 1, wherein the tube is made of laminated foils comprising an intermediate foil which acts as a $CO_2$ and an $O_2$ barrier.

5. The receptacle according to claim 1, wherein the tube comprises a barrier made of ethylene vinyl alcohol copolymer or a foil which is coated with $SiO_x$.

6. The receptacle according to claim 1, wherein the tube consists of laminated foils comprising an inner and an outer foil made of the same material.

7. The receptacle according to claim 1, wherein the rigid opening portion consists of polypropylene.

8. The receptacle according to claim 1, wherein the receptacle comprises a tip and a closure selected from the group consisting of a closure plug and a closure cap for closing the tip.

9. The receptacle according to claim 1, wherein the receptacle further comprises a rigid opening portion and a fastening ring surrounding a tip of the opening portion.

10. The receptacle according to claim 1, wherein the receptacle contains a liquid in a quantity not exceeding 1.5 ml.

11. The receptacle according to claim 1, wherein the receptacle contains nitrogen in the gas phase as the only gas therein.

12. The receptacle according to claim 1, wherein the receptacle has a filling volume of 0.5 to 2 ml.

13. The receptacle according claim 1, wherein the receptacle comprises (a) a frangible tip wherein an upper tip portion closes the receptacle and (b) a predetermined breaking point between the upper and a lower tip portion.

14. The receptacle according to claim 13, wherein the predetermined breaking point is concave and borders on an upper angular edge of the lower tip portion of the frangible tip.

15. The receptacle according to claim 13, wherein the lower tip portion of the tip comprises a plurality of projecting locking elements which are so designed that it is not possible to unfasten a fastening ring attached at the receptacle or at the lower tip portion without sustaining damage.

16. The receptacle according to claim 15, wherein a cap element is attached at the fastening ring by an internal and an external thread or a bayonet joint.

* * * * *